Patented Jan. 21, 1941

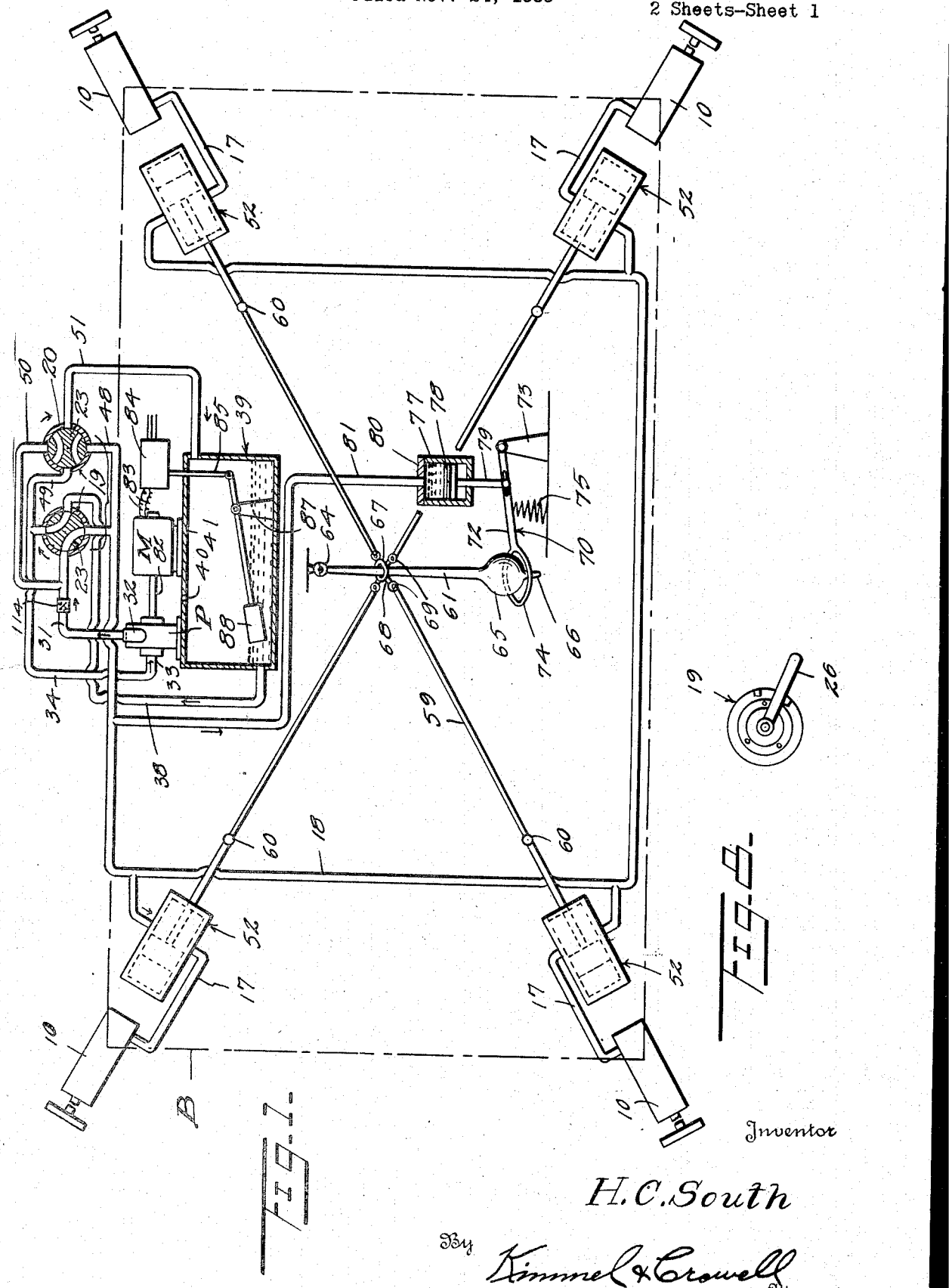

2,229,530

UNITED STATES PATENT OFFICE 2,229,530

VEHICLE JACK

Henry C. South, Lorton, Va.

Application November 24, 1939, Serial No. 306,018

8 Claims. (Cl. 280—6)

This invention relates to vehicle jacks and more particularly to a jack structure which is adapted to hold the body of the vehicle in a level position irrespective of the angular position of the chassis and wheels.

An object of this invention is to provide a jack structure of this kind which is secured to the underside of a vehicle body and which may, at will, be operated to lift one side or end of the body so as to maintain the body in a horizontal position.

Another object of this invention is to provide a structure of this kind including a plurality of fluid operated jacks and an improved controlling means for controlling the flow of fluid to selected jacks so as to level the body of the vehicle.

A further object of this invention is to provide in a jack structure of this kind means for rendering the operating means for the jack ineffective after the body of the vehicle has been levelled or raised to a predetermined point.

A still further object of this invention is to provide in a jack structure of this kind a single control means whereby the jacks may be operated in one position of the control means to raise or level the body of the vehicle and in another position of the control means to move the jacks vertically to permit the body of the vehicle to assume its normal position with respect to the wheels or vehicle frame structure.

A further object of this invention is to provide a structure of this kind including a single pressure means which may be connected to the vehicle battery or which if desired may be connected to other sources of electric current supply.

A further object of this invention is to provide a structure of this kind which includes an improved electric circuit connected to the power member for the pressure pump so that the power member will be cut off when the vehicle has been raised to a predetermined point or lowered to a predetermined point, the electric circuit being associated with the fluid control means so that the operation of the control means will be correlated with the electrical power member for the pressure pump.

To the foregoing objects and to others which may hereinafter appear, the invention consists of the novel construction, combination and arrangement of parts as will be more specifically referred to and illustrated in the accompanying drawings, wherein is shown an embodiment of the invention, but it is to be understood that changes, modifications and variations may be resorted to which fall within the scope of the invention as claimed.

In the drawings:

Figure 1 is a diagrammatic view partly in section of a fluid operated jack structure constructed according to an embodiment of this invention, Figure 2 is a fragmentary vertical section of a portion of the jack structure and operating means therefor, Figure 3 is a sectional view taken on the line 3—3 of Figure 2, Figure 4 is a longitudinal section taken through the controlling member, Figure 5 is a sectional view taken on the line 5—5 of Figure 4, Figure 6 is a sectional view taken on the line 6—6 of Figure 4, Figure 7 is a diagrammatic view of the electric circuit embodied in this invention, and Figure 8 is a detailed end elevation of the controlling member.

Referring to the drawings, the character B designates generally the body of the vehicle which may be the body of a trailer or other vehicle which is mounted on a chassis being supported by springs from the chassis in the normal manner. The body B has secured to each of the four corners thereof a fluid operated jack structure generally designated as 10. The jack structure 10 is provided with an upper base plate 11 secured as by fastening members 13 to the bottom 12 of the body B. A plunger 14 is slidably carried by the jack structure 10 being provided with a lower head 15 which is adapted when in projected position to engage the ground or other plane surface.

The cylinder 16 of the jack 10 has a fluid pipe 17 connected at one end thereto and the opposite end of the pipe 17 to a valve housing which is connected to a main fluid pipe line 18 positioned beneath the body B as will be hereinafter described. The main pipe line 18 as shown in Figure 1 is of substantially rectangular configuration and has a pipe 17 extending therefrom to each jack 10 positioned at the four corners of the body B. The pipe 18 is connected to a fluid controlling member or multiple valve structure generally designated as 19. The valve structure 19 constitutes a manually operated selector means for regulating the flow of liquid from the pump or pressure means P to the valves 52 and to the reservoir 39 so that the operation of the pump need not be reversed to either project or retract the jacks 10. This valve structure 19 may be positioned at any desired point within the body B and remote from the bottom 12. The controlling member or valve 19 comprises a cylindrical housing 20 provided at one end with an end wall 21 and at the other end with a head 22 which may be threaded or otherwise removably mounted in the cylinder 20.

A valve plug 23 is rotatably mounted in the cylinder 20 and has an operating shaft 24 secured thereto which extends through a bore 25, provided in the head 22. A handle or operator 26 is secured to the extended end of the shaft or stem 24. A spring 27 may be mounted within the cylinder 20 about the shaft 24, bearing at one end against the inner end of the head 22 and at the other end against the plug 23. The cylinder 20 is provided with a fluid port 28 and the valve plug 23 is provided with an arcuate fluid passage 29 which in one position of the plug 23 is adapted to communicate at one end with the port 28. The cylinder 20 is provided with a second passage or port 30 which when the passage 29 communicates with the port 28 is adapted to communicate with the opposite end of the passage 29 so as to thereby provide communication from the port 28 to the port 30. The port 30 has one end of a pressure pipe line 31 connected thereto and the opposite end of the pressure line 31 is connected to the outlet or pressure side 32 of a pressure pump P.

The pump P has the intake or suction side 33 connected to one end of a suction pipe line 34. The opposite end of the suction line 34 is connected to a suction port 35 formed in the cylinder 20. A second suction port 36 is formed in the cylinder 20 and the valve plug 23 is provided with an arcuate fluid passage 37 which is adapted to communicate the port 35 with the port 36. The port 36 has one end of a suction pipe line 38 connected thereto and the opposite end of the suction pipe line 38 is connected to the lower portion of a fluid reservoir 39. The reservoir 39 is adapted to be positioned at any suitable point relative to the body B and is provided with a vent 40 in the top wall 41 thereof.

The valve plug 23 is also provided with a second pair of fluid passages 42 and 43 which are spaced from the passages 29 and 37. The cylinder 20 is provided with a pair of ports 44 and 45 which are adapted to communicate with the passage 42 in one position of the plug 23 and the cylinder 20 is also provided with a second pair of ports 46 and 47 which are adapted to communicate with the passage 43 when the passage 42 communicates the two ports 44 and 45 together. The pipe line 18 is provided with a branch 48 which is connected to the port 44 and a branch 49 is connected to the port 45 and is also connected to the suction pipe 34. The port 47 is connected by a branch pipe 50 to the pipe 31 and the port 46 is connected by a pipe 51 to the reservoir 39 adjacent the upper portion of the reservoir 39. This pipe 51 comprises a return pipe for returning the liquid to the reservoir 39 when the controlling member 19 is operated so that the pump P will withdraw the liquid from the jack cylinder 16 and thereby positively raise the plunger members 14.

A jack controlling valve generally designated as 52 is associated with each jack 10 and is interposed in the branch pipe 17. The valve structure 52 comprises a valve housing 53 having a valve plug 54 slidable therein. The valve housing 53 is provided with diametrically opposed ports 55 and 56 and when the vehicle body B is in a level position, the valve plug 54 will be in the position shown in Figures 2 and 3 wherein the plug 54 uncovers the two ports 55 and 56. The housing 53 is supported from the bottom wall 12 of the body B by means of a supporting bracket or structure 57. Each valve plug 54 has a stem or rod 58 which is slidable through a head 59 carried by the housing 53 and the outer or projecting end of the valve rod 58 is connected to one end of a link 59 by means of a substantially universal coupling 60.

A pendulum 61 is swingably secured at its upper end to a supporting plate 62 which is fastened by fastening devices 63 to the bottom wall 12 by means of a substantially universal coupling 64. The pendulum 61 is provided at its lower end with a substantially spherical head 65 and a stem 66 which projects downwardly therefrom. A spider structure comprising a ring 67 is secured to the pendulum 61 above the head 65 and a plurality of radially arranged arms 68 are formed with the ring 67. Each arm 68 is connected by means of a substantially universal coupling 69 to the inner end of a link 59. By providing the universal coupling means 60 and 69 and the universal coupling 64 the pendulum 61 may swing in any desired position relative to the body B and when the pendulum 61 swings to a vertical position with the body B at an angle relative to the horizontal the pendulum 61 will move therewith all of the valve plugs 54. In this manner the valve plugs 54 on the low side of the body B will be moved forwardly and away from the ports 55 and 56 whereas the valve plugs 54 on the high side of the body B will be pulled across the ports 55 and 56 so as to thereby close these ports and prevent any liquid from entering the jack cylinders 16 which are on the high side of the body B.

A pendulum keeper generally designated as 70 is supported from a supporting structure 71 which is secured to the bottom wall 12 of the vehicle. The keeper structure 70 comprises a lever 72 which at one end is pivotally mounted on a standard or bearing structure 73 and the opposite end of the lever 72 has a ring or eye 74 fixed thereto. This ring or eye 74 when the keeper 70 is in locked position is adapted to snugly engage about the head 65 of the pendulum 61 so as to hold the pendulum 61 against swinging movement in any direction. A spring 75 engages at one end against the bottom 76 of the support 71 and at the other end engages against the under side of the lever 72. In this manner, the ring or keeper member 74 is normally held in engagement with the head 65.

In order to provide a means whereby the keeper member 70 may be moved to released position when the control member 19 is operated, I have provided a cylinder 77 having a piston 78 slidable therein. A rod 79 is connected at one end to the piston 78 and at the other end is connected to the lever 72. The head 80 of the cylinder 77 has one end of a pipe 81 connected to the pipe 18.

An electrical motor M is mounted in a position where the shaft 82 thereof will operate the pump P and the electric motor M is connected by wires 83 to a three-way switch 84. The switch 84 is provided with an operating member 85 which extends through the top wall 41 of the reservoir 39 and is connected to one end of a float operated lever 86. The lever 86 is pivotally mounted on a bearing structure 87 supported within the reservoir 39 and the free end of the lever 86 has a float 88 fixed thereto. The three-way switch structure 84 is connected by means of wires 89 and 90 to a second three-way switch structure 91. The switch 91 is operatively connected with the shaft 24 of the controlling member 19. The switch structure 84 includes a pair of contacts 92 and 93 which are connected to the wires 89 and 90 respectively and also includes a switch arm 94 which is connected to a terminal 95. The terminal 95 is connected to one wire 83. The wiper 94 is connected to the operating link 85 so that when the fluid in the reservoir 39 is at its lowermost level, the switch arm or wiper 94 will connect the terminal 95 with the contact 93. When the reservoir 39 is substantially filled the wiper or switch arm 94 will connect the terminal 95 with the terminal or contact 92. When the valve structures 52 are in normal position, all of these valves will be in open position so that the ports 55 and 56 will be in communication with each other through the cylinders 53. In this position the pendulum 61 is in a vertical position being held thereby by the keeper 70. At this time the reservoir 39 is substantially filled with liquid. After the keeper 70 has been released as will be hereinafter described so as to permit the pendulum 61 to swing to a vertical position with the body B inclined to the horizontal, the valves on the high side of the body B will be drawn across the ports 55 and 56 of the high side valves 52 thus cutting off the flow of liquid from the main line 18 through the cylinder 53 and the pipe 17 to the jacks 10 on the high side. The valves 52 on the low side of the body B will be moved outwardly of the cylinders 53 by the swinging of the pendulum 61. Initially the handle 26 of the manually operated selector means 19 is swung to a position communicating the pressure side of the pump P with the fluid line 18. The pressure built up in the pressure line 18 will also be communicated to the pipe line 81 and the keeper cylinder 77 so as to thereby move the piston 78 in this cylinder downwardly and swing the keeper 70 downwardly to a released position. When the keeper 70 is in a released position, the pendulum 61 may then swing to a vertical or perpendicular position with the body B inclined and the swinging of the pendulum 61 to a vertical position will move the valves 52 on the low side to a further open position whereas the valves on the high side will be drawn across the ports 55 and 56 so as to close these valves. The liquid will then be pumped from the reservoir 39 into the fluid line 18 through the low side valves 52 into the low side jacks 10 so as to raise these jacks and level the body B.

After the body B has been levelled, the motor M may be cut off either manually or will be cut off by the float operated switch 84. The transformer T which is connected to the main switch structure and to the plug or connector 113 is adapted to be used where house current is available and it is not desired to use the current from the battery 106.

The switch structure 91 includes a pair of terminals 96 and 97 connected to the wires 89 and 90 respectively and also includes a terminal 98 having a wiper 99 connected thereto. The wiper 99 is fixedly secured to the shaft 24 and is operable thereby. The motor M has the second wire 83a connected to a terminal 100 of a main switch 101 and this switch 101 is provided with a second terminal 102 which is connected by a wire 103 to the terminal 98. A second pair of terminals or contacts 104 and 105 are formed with the switch 101 and are adapted to be connected to a battery or suitable source of current supply 106. The switch structure 101 also includes a third pair of terminals or contacts 107 and 108 which may be connected by wires 109 and 110 respectively to the output side of a transformer T. The input side of the transformer T is provided with input wires 111 and 112 which are connected to a plug or connector 113 so that the transformer T may be connected to a source of house current supply operating on 110-120 volts. The transformer T is adapted to step down this house current to approximately six volts which will operate the motor M.

In the use and operation of this jack structure, when it is desired to raise one side or end of the vehicle body B, the controlling member 19 has the plug 23 thereof rotated to the position shown in Figure 5. In this position the pressure side 32 of the pump P communicates with the pipe 18 through the fluid passage 29. When the plug 23 is in the position shown in Figure 5, the wiper 99 will be in the position shown in Figure 7. At this time, the reservoir 39 will be filled with liquid and the wiper 94 will connect the terminal 95 with the terminal 92 so as to complete the electric circuit from the battery 106 through the wires 103, 89 and 83 to one side of the motor M whereas the opposite side of the motor M is connected to the battery 106 through the wire 83a, terminal 100 and contact 105.

The pendulum 61 at this time will be held against swinging movement by the keeper 70 but as the pressure is built up in the pipe 18 and in the pipe 81 this pressure will force the piston 78 downwardly so as to move the keeper 70 to a released position. In the released position of the keeper 70, the pendulum 61 may freely swing to a vertical position and as the pendulum 61 swings to a vertical position, the valve plugs 54 on the high side of the vehicle body B will be pulled across the valve ports 55 and 56 thereby closing these ports. The valve plugs 54 on the low side of the body B will be moved forwardly beyond the ports 55 and 56 thus permitting the liquid to flow through the ports 55 and 56 and the pipe 17 to the low cylinders 16. The plungers 14 on the low side of the body B will then be moved downwardly until they contact with the ground whereupon the body B on the low side will be raised until it reaches a substantially horizontal position. When the body B is in a substantially horizontal position all of the valve plugs 54 will be in a port uncovering position so that all of the jacks will at this time be operated to raise the body B. This raising movement will continue until the reservoir 39 has sufficient quantity of liquid withdrawn therefrom to permit the float 88 to move the switch arm 94 out of engagement with the contact 92. In the lowermost position of the float 88 the switch arm 94 will connect the terminal 95 with the contact 93. The circuit to the motor M will thus be broken.

When it is desired to lower the vehicle body the handle 26 is swung in a clockwise direction so as to bring the passages 42 and 43 into communication with the ports 44 and 45 and the ports 46 and 47 respectively. In this position of the valve plug 23 the suction side 33 of the pump P is connected to the pipe 18 so that the liquid in the pipe 18 will be drawn back into the reservoir 39. At the time the handle 26 is moved to withdraw the liquid from the cylinders 16, the switch arm 99 is swung to a position connecting the terminal 98 with the terminal or contact 97. The switch arm 99 will thereby complete the circuit to the motor M until the reservoir is substantially filled whereupon the switch arm 94 will be swung out of engagement with the terminal 93 and into engagement with the terminal 92.

The use of the two 3-way switch structures 84 and 91 will permit the operation of the motor M by the selector means 19 when the selector means 19 is moved from a position communicating the pressure side of the pump P with the jacks 10 to the suction side of the pump. Assuming that the reservoir 39 is filled, the float member 88 will be in an uppermost position and in this position the wiper 94 will connect the terminals 92 and 95 together. The wiper 99 will be swung to a position connecting the terminal 96 with the terminal 99 thus completing the circuit on one side to the terminal 102 of the main switch. The wire 83ᵃ is connected directly to the motor M and to the terminal 100. When the vehicle has been raised to the desired position in the event the float 88 does not swing the wiper 94 out of engagement with the contact 92, the switch structure 91 may be operated by the handle 26 so as to connect the suction side of the pump P with the pipe line 18 and with the jacks 10.

In practice, however, the float structure 88 is so arranged that when the vehicle body B is substantially horizontal, the float 88 will swing the wiper 94 from the terminal 92 to the terminal 93 and as at this time the wiper 99 is in the dotted line position shown in Figure 7 connecting the terminals 96 and 98, the circuit to the motor M will thereby be broken. In this manner it is not necessary to operate the selector structure 19 so as to simultaneously cut off the pressure side of the pump P and also swing the wiper 99 from the terminal 96 to the terminal 97.

With the liquid in the reservoir 39 at its lower level and the wiper 94 connecting the terminals 93 and 95 as shown in full lines in Figure 7, the circuit will be broken to the terminal 102. It will be understood that when the liquid in the reservoir is at its lower level the vehicle body and the reservoir 39 will be substantially horizontal, so that the condition of the wheels will not affect the operation of the float 88. The motor M may again be operated when it is desired to retract the jacks 10 by swinging the handle 26 of the selector means 19 so as to rotate the plug 33 and connect the suction side of the pump P with the fluid line 18 and jacks 10. When the reservoir 39 is substantially filled with the returned liquid which is drawn from the jacks 10 and from the keeper operating structure 77, the float structure 88 will pull the link 85 downwardly and thereby swing the wiper 94 from the terminal 93 to the terminal 92. The circuit to the motor M which is active when the selector means 19 is connected to the suction side of the pump P will thereby be broken so as to make it unnecessary to swing the handle 26 in order to break the circuit in the switch 91.

When the liquid is withdrawn from the cylinders 16, the liquid will also be withdrawn from the keeper operating cylinder 77 so that the keeper 70 will be moved by the spring 75 into engagement with the pendulum head 61. The stem 66 on the lower end of the head 65 will prevent undue swinging movement of the head 65 and thus maintain this head in a position for engagement with the ring 74 when the ring 74 is raised to a locked position by the spring 75.

In order to provide a means whereby the jacks 10 may be held in their projected position to hold the body B raised when the motor M stops, a check valve 114 may be interposed in the pressure line 31 so as to prevent return of the fluid from the pipe line 18 through the selector 19 when the selector is turned to a position to raise the body B.

What I claim is:

1. A vehicle levelling means comprising a plurality of jacks disposed adjacent the corners of the vehicle, a valve for each jack, a pendulum swingingly supported from the vehicle, means connecting said pendulum with said valves, a fluid reservoir, means connecting said reservoir with said valves, a pump interposed in said connecting means, an operator for said pump, spring pressed means normally holding said pendulum against movement, and fluid actuated means correlated with said holding means and said pump for shifting said holding means to released position.

2. A vehicle levelling means comprising a plurality of fluid actuated jacks disposed beneath the vehicle, a valve connected to each jack, a pump, a manually operated selector means connected to each side of said pump, an operator for said pump, means connecting said selector means to said valves, a reservoir connected to said selector means, said selector means regulating the flow of liquid from the pump to said valves and said reservoir, and gravity actuated means connected to said valves for operation thereby.

3. A vehicle levelling means comprising a plurality of fluid actuated jacks disposed adjacent the corners of the vehicle, a valve connected to each jack, a pump, a manually operated selector pipe means connected to the pressure and suction sides of said pump, an operator for said pump, pipe means connecting said selector means to said valves, a reservoir connected to said selector means, gravity actuated means connected to said valves for operation of said valves thereby, and means connected to said selector means and correlated with said gravity actuated means for normally holding said gravity actuated means against operation by gravity.

4. A vehicle levelling means comprising a plurality of fluid actuated jacks disposed adjacent the corners of the vehicle, a valve connected to each jack, a pump, a manually operated selector means connected to both the pressure and suction sides of said pump, an operator for said pump, pipes connecting said selector means with said valves, a reservoir, inlet and outlet pipes connected to said reservoir and said selector means, a pendulum pivotally carried by said vehicle, means connecting said pendulum with said valves, a keeper, pivotal mounting means for said keeper, yieldable means normally holding said keeper in a position to hold said pendulum against swinging movement and fluid actuated means engaging said keeper and correlated with said selector means whereby to communicate said fluid actuated means with the pressure side of said pump when said valves are connected to the pressure side of said pump.

5. A vehicle levelling means comprising a plurality of fluid actuated jacks disposed adjacent the corners of the vehicle, a pump, a manually operated selector means connected to both the pressure and suction sides of said pump, a valve for each jack interposed in the connections between said selector and said pump, a gravity actuated valve operator connected to said valves, an electric motor for said pump, a fluid reservoir connected to said selector, a float operated three-way switch carried by said reservoir and connected to said motor for controlling the operation thereof in accordance with the depth of liquid in said reservoir, and a second three-way switch actuated by said selector and connected to said first switch and to a source of current supply for connection with or cutting off the supply of current from said first switch.

6. A vehicle levelling means comprising a plurality of fluid actuated jacks disposed adjacent the corners of the vehicle, a pump, a manually operated selector means connected to both the pressure and suction sides of said pump, a valve for each jack interposed in the connections between said selector and said pump, a gravity actuated valve operator connected to said valves, an electric motor for said pump, a fluid reservoir connected to said selector, a float operated three-way switch carried by said reservoir and connected to said motor for controlling the operation thereof in accordance with the depth of liquid in said reservoir, a second three-way switch actuated by said selector and connected to said first switch and to a source of current supply for connection with or cutting off the current supply from said first switch, a keeper for said valve operator, means normally holding said keeper in a position to hold said valve operator against movement, and fluid actuated means connected to said keeper and to said selector whereby to shift said keeper to released position when said selector communicates the pressure side of said pump with said valves.

7. A vehicle levelling means comprising a plurality of fluid actuated jacks disposed adjacent the corners of the vehicle, a pump, a manually operated selector means connected to both the pressure and suction sides of said pump, a valve for each jack interposed in the connections between said selector and said pump, a gravity actuated valve operator connected to said valves, an electric motor for said pump, a fluid reservoir connected to said selector, a float operated three-way switch carried by said reservoir and connected to said motor for controlling the operation thereof in accordance with the depth of liquid in said reservoir, a second three-way switch actuated by said selector and connected to said first switch and to a source of current supply for connection with or cutting off the current from said first switch, a pivoted lever, a keeper carried by said lever engageable with said valve operator for holding said valve operator against movement, a spring engaging said lever normally holding said keeper in engagement with said valve operator, and fluid actuated means connected to said lever and to said selector whereby to shift said keeper to released position when said selector communicates the pressure side of said pump with said valves.

8. A vehicle levelling means comprising a plurality of fluid actuated jacks disposed beneath the vehicle, a valve connected to each jack, a pump, a manually operated selector means connected to each side of said pump, an operator for said pump, means connecting said selector means to said valves, a reservoir connected to said selector means, said selector means regulating the flow of liquid from the pump to said valves and said reservoir, and means connected to said valves for operation thereby.

HENRY C. SOUTH.